(12) United States Patent
Anderson

(10) Patent No.: US 8,495,340 B2
(45) Date of Patent: Jul. 23, 2013

(54) MULTI-PROCESSOR SYSTEMS COMMUNICATING USING DATA AND CONTROL TOKENS

(76) Inventor: James Arthur Dean Wallace Anderson, Reading (GB)

(*) Notice: Subject to any disclaimer, the term of this patent is extended or adjusted under 35 U.S.C. 154(b) by 615 days.

(21) Appl. No.: 12/601,999

(22) PCT Filed: May 30, 2008

(86) PCT No.: PCT/GB2008/001821
§ 371 (c)(1),
(2), (4) Date: May 20, 2010

(87) PCT Pub. No.: WO2008/145995
PCT Pub. Date: Dec. 4, 2008

(65) Prior Publication Data
US 2010/0228949 A1    Sep. 9, 2010

(30) Foreign Application Priority Data

May 31, 2007    (GB) .................................. 0710377.3

(51) Int. Cl.
*G06F 15/82* (2006.01)
(52) U.S. Cl.
USPC ......................................................... 712/28
(58) Field of Classification Search
USPC ......................................................... 712/28
See application file for complete search history.

(56) References Cited

U.S. PATENT DOCUMENTS

| | | | |
|---|---|---|---|
| 4,809,159 A | 2/1989 | Sowa | |
| 5,561,804 A | 10/1996 | Kanekura | |
| 5,761,523 A | 6/1998 | Wilkinson et al. | |
| 6,507,904 B1 * | 1/2003 | Ellison et al. | 712/229 |
| 6,553,442 B1 * | 4/2003 | Arimilli et al. | 710/110 |
| 7,461,236 B1 * | 12/2008 | Wentzlaff | 712/10 |
| 7,743,236 B2 * | 6/2010 | Saito et al. | 712/227 |
| 7,908,462 B2 * | 3/2011 | Sung | 712/28 |
| 7,962,717 B2 * | 6/2011 | May | 712/16 |
| 2002/0066007 A1 | 5/2002 | Wise et al. | |
| 2004/0019775 A1 * | 1/2004 | Wise et al. | 712/300 |
| 2004/0039894 A1 | 2/2004 | Woodall et al. | |
| 2004/0250046 A1 | 12/2004 | Gonzalez et al. | |
| 2009/0300327 A1 * | 12/2009 | Omtzigt | 712/42 |

OTHER PUBLICATIONS

Liu et al, "A low power embedded dataflow coprocessor," IEEE Computer Society Annual Symposium on VLSI, May 12, 2005, pp. 17-18, 0/7695-2365-X, APT group, School of Computer Science, University of Manchester, Manchester, United Kingdom.
Grafe v g et al:"Implementation of the epsilon psilon dalaflow processor"; 19900102;19900102-19900105, vol. i, Jan. 2, 1990, pp. 19-29, XP010010405; figures 2-4, 6-8; . . . .

(Continued)

*Primary Examiner* — Eric Coleman
(74) *Attorney, Agent, or Firm* — Fraser Clemens Martin & Miller LLC; William J. Clemens

(57) ABSTRACT

A processing apparatus comprises a plurality of processors (12), each arranged to perform an instruction, and a bus (20) arranged to carry data and control tokens between the processors. Each processor (12) is arranged, if it receives a control token via the bus, to carry out the instruction, and on carrying out the instruction, to perform an operation on the data, to identify any of the processors (12) which are to be data target processors, and to transmit output data to any identified data target processors, to identify any of the processors which are to be control target processors, and to transmit a control token to any identified control target processors.

18 Claims, 3 Drawing Sheets

OTHER PUBLICATIONS

Weiss s et al:"Architectural Improvements for a Data-Driven VLSI Processing Array"; Journal of Parallel and Distributed Computing, Elsevier, Amsterdam, NL, vol. 19, No. 4 . . . , 1993.

Yijun Liu et al: "The Design of a Dataflow Coprocessor for Low Power Embedded Hierarchical Processing"; Integrated Circuit and System Design. Power and Timing Modeling, . . . , 2006.

* cited by examiner

MULTI-PROCESSOR SYSTEMS COMMUNICATING USING DATA AND CONTROL TOKENS

The present invention relates to processors.

Typically a processor chip includes a large number of individual processors each arranged to carry out an instruction. There are normally a large number of different instructions performed by the different processors each of which communicates with a host memory. The requirement to encode many instructions in a processor makes the processor large, thereby limiting the number of processors that can be fabricated on a chip and the requirement to communicate with the host memory slows each processor down.

Accordingly the present invention provides a processing apparatus comprising a plurality of processors. Each processor may be arranged to perform a single instruction which may be the same for each processor. The apparatus may further comprise a bus arranged to carry data and control tokens between the processors. Each processor may be arranged, if it receives a control token via the bus, to carry out the instruction, and on carrying out the instruction, it may perform an operation on the data, which may identify any of the processors which are to be data target processors. The processor may also transmit output data to any identified data target processors. It may also identify any of the processors which are to be control target processors, and may transmit a control token to any identified control target processors.

The output data may be the result of the instruction, or it may be data stored, for example in the processor.

The bus may be arranged to carry data and control tokens between the processors without requiring the fetching of data from host memory.

The bus may comprise a plurality of bus frames and be arranged to move the data and/or the control tokens between frames to move them along the bus. Each processor may have one or more of the bus frames associated with it from which data can be written to the processor.

The data may be carried on the bus in the form of data tokens.

Each processor may be arranged to perform the same instruction as every other processor. Each processor may be arranged to perform only one instruction. Each time that each processor performs its instruction it may be able to identify no, one, or more than one, data target processor, and no, one, or more than one control target processor. This can enable it to transmit data to multiple processors in parallel. The bus may be arranged to transmit the result to the identified data target processor so that it can be written into the data target processor.

Each processor may be arranged to transmit a control token by writing it to the bus together with the address of the control target processor to which it is to be transmitted. Each processor may be able, on performing the instruction, to identify a plurality of control target processors to which it can transmit control tokens in parallel.

Each processor is preferably arranged, when it has transmitted the result and a control token to any identified target processors, to give up possession of its control token so that it will not perform the instruction again until it receives another control token.

The instruction may be a multiply-add of the form $a \times b + c \rightarrow r'$.

Each processor may be arranged to select any control processors on the basis of the result $r'$. For example each processor may be arranged to determine whether the result $r'$ is less than zero, zero, greater than zero, or nullity, and select any control target processors or data target processors accordingly.

Each processor may comprise a plurality of memory cells in which the inputs to the instruction can be stored. Each processor may comprise a plurality of memory cells in which addresses of control target processors can be stored. All memory in every processor may be set to a fixed value on power up so that the processors do not execute arbitrary programs as would otherwise be the case with arbitrary values being set on power up.

Preferred embodiments of the present invention will now be described by way of example only with reference to the accompanying drawings in which.

Figure 1:
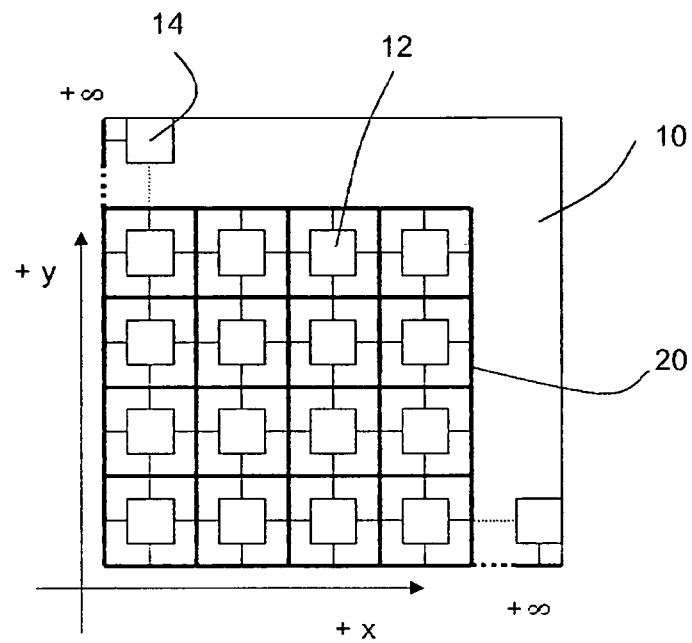
FIG. 1 is a schematic diagram of a processor chip according to an embodiment of the invention.

Referring to FIG. 1, a processor chip 10 comprises a two dimensional rectangular array of processors 12. Each processor or tuple 12 has an address defined by perpendicular coordinates x, y. The main array is of finite size with addresses having y coordinates centred on the origin and extending from $-y_{max}$ to $+y_{max}$ and x coordinates also centred on the origin and extending from $-x_{max}$ to $+x_{max}$. At each end of each row and each column of the main array of processors 12 is an input/output processor or I/O device 14 which has either an x coordinate of $+\infty$ or $-\infty$ or a y coordinate of $+\infty$ or $-\infty$. Only one quarter of the chip 10 is shown in FIG. 1, which is in the positive quadrant of the coordinate system. A number of chips can be combined to form a single machine with data moving from one chip to the next via the I/O devices 14.

Bus

Figure 2:
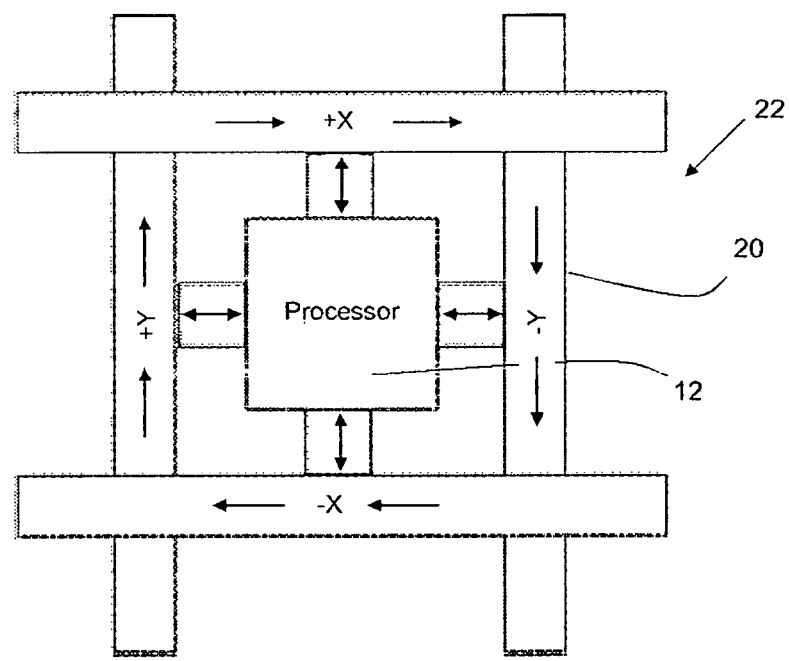
FIG. 2 is a schematic view of one processor and sections of buses of the chip of FIG. 1.

A series of buses 20 are laid out in a rectangular grid between the processors 12. Between each column of processors 12, there are a pair of busses extending in the y direction, one +Y being arranged to transfer data in the positive Y direction and the other −Y being arranged to transfer data in the negative Y direction. Between each row of processors 12, there are a pair of busses extending in the X direction, one +X being arranged to transfer data in the positive X direction and the other −X being arranged to transfer data in the negative X direction. Each pair of busses 20 is shown as a single line in FIG. 1, but the parts of the individual buses 20 surrounding one of the processors 12 are shown in FIG. 2. FIG. 2 therefore shows a single processor tile 22 which forms a basic unit which is repeated across the chip 10 to build up the entire chip. Each processor 12 is connected to each of the four busses 20 that are adjacent to it on its four sides, so that each processor can put data onto the appropriate bus for it to be transmitted in any of the four directions.

Figure 3:
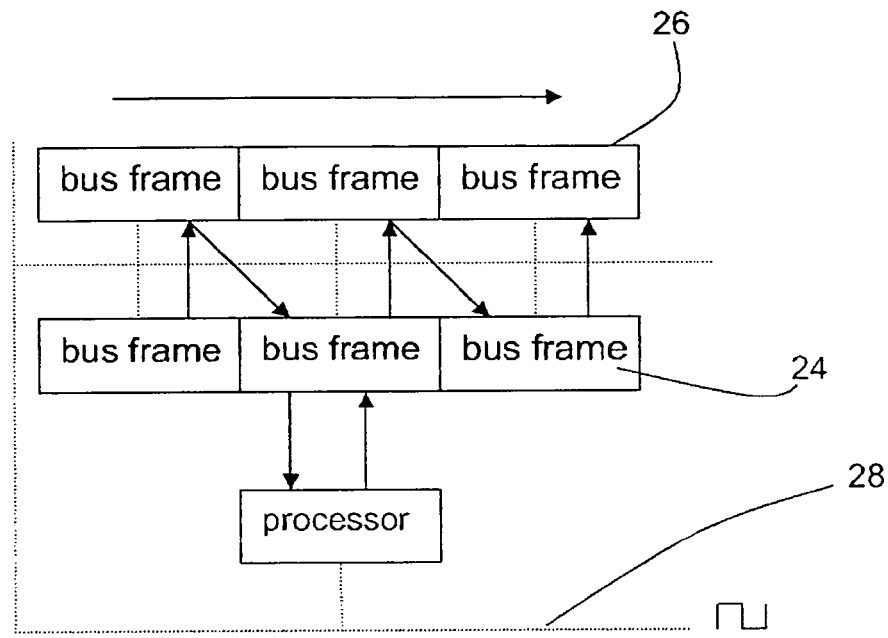
FIG. 3 is a schematic diagram of a part of one of the buses of the chip of FIG. 1.

Referring to FIG. 3, each of the uni-directional buses 20 comprises a series of bus frames 24 each of which is made up of a number of memory cells, and a parallel series of temporary frames 26 each of which is made up of the same number of memory cells. Each of the temporary frames 26 is connected to two adjacent bus frames 24 so that it can receive data from one of them and output data into the other of them. Therefore data can be transmitted along the bus by being transferred from one bus frame 24 to the next one in the direction of the bus, via the appropriate temporary frame 26. Each processor 12 is connected to one of the bus frames 24 on each of the buses that pass adjacent to it, so that it can accept data from the bus, and write data to the bus at that point.

All of the processors 12 and all of the bus frames 24 and temporary frames 26 are connected to a common clock line 28 on which a clock signal is transmitted. This is used to coordinate the timing of the transfer of data along the buses 20 and between the buses 20 and processors 12. The data in a bus frame is copied to its adjacent bus frame, via a temporary bus frame, every clock tick. Generally the moving of data between bus frames occurs at a frequency that is higher than the frequency at which each of the processors performs its instruction. This allows a processor to transmit more than one datum along a bus in one processor clock cycle. Barring fabrication errors, processors have a neighbouring tuple on either side, and I/O tuples have a neighbouring tuple on exactly one side.

Arithmetic

The machine uses a fixed-point arithmetic implemented in a modified twos-complement encoding. Standard twos-complement arithmetic has a bit string for zero, an odd number of bit strings encoding consecutive, positive integers, and an even number of bit strings encoding consecutive, negative integers. There are bit strings for one more negative integer than positive. The standard arithmetic sets a status flag on overflow. By contrast, this embodiment uses a modified twos-complement arithmetic which identifies nullity $\Phi$ with the bit string for the most negative integer, producing an encoding with an equal, odd, number of bit strings on either side of zero, excluding nullity. The signed infinities $\pm\infty$, are identified with the bit string for the remaining most positive and most negative integer, leaving an equal, even, number of consecutive (finite) integers on either side of zero, excluding nullity and the signed infinities. On overflow the arithmetic rounds to a signed infinity. Given this basic encoding of integers, numbers are held in a fixed point format i.f where i are the integral bits and f are the fractional bits. As just stated, the i bits include the bit patterns for sign, infinity, and nullity using a modified twos-complement encoding. This implies that, where there are the same number of bits in the integral and fractional parts, the fractional part has more precision than the integral part. Numbers are usually written in the format $\pm(i.f)$ to make clear that they are signed. Details of the modified two's complement arithmetic used in this embodiment can be as described in GB 0625735.6. The definition of nullity is provided by the following axioms: nullity is the result of subtracting infinity from infinity; nullity is the result of multiplying infinity by zero; the result of adding any number to nullity is nullity, the result of multiplying any number by nullity is nullity.

Data Format

Figure 4:
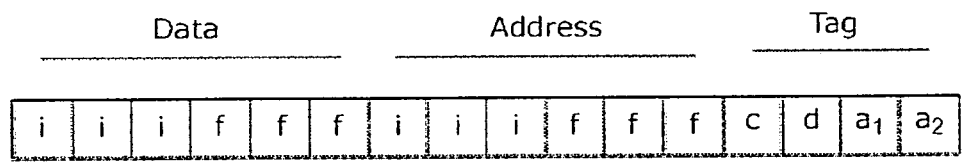
FIG. 4 is a diagram of a data frame as transmitted along the buses, and between the processors, of the chip of FIG. 1.

Referring to FIG. 4, the bus is arranged to transfer data or information in groups of bits in the form of tokens. Each token comprises three fields: a data field comprising a first group of bits, including integer bits i and fractional bits f, an address field comprising a second group of bits, including integer bits i and fractional bits f, and a tag field comprising a group of four bits c, d, $a_1$, $a_2$ which are each used as a tag indicating the status of the token in various ways. Each token can be of two different types: a control token or a data token, identified by the c and d tags as will be described below.

Data tokens have one address field in the format $\pm(i.f)$ that defines a general address or two addresses, giving the potential for binary fan out and, in addition, they have one number $\pm(i.f)$ which is the data to be written. Control tokens have one address field in the format $\pm(i.f)$ that defines a general address or two addresses, giving the potential for binary fan out of control.

There are four tag bits c, d, $a_1$, $a_2$. The c bit denotes whether the current bus frame contains a control token. The d bit denotes whether the current bus frame contains a data token. Two bits are specified in this embodiment so that it is possible to have a single token denote that control and data are being sent to the same processor. The $a_1$ bit denotes whether the token is to be delivered to the $a_1$ address or whether it has been delivered there. Similarly, the $a_2$ bit denotes whether the token is to be delivered to the $a_2$ address or whether it has been delivered there.

Figure 5:
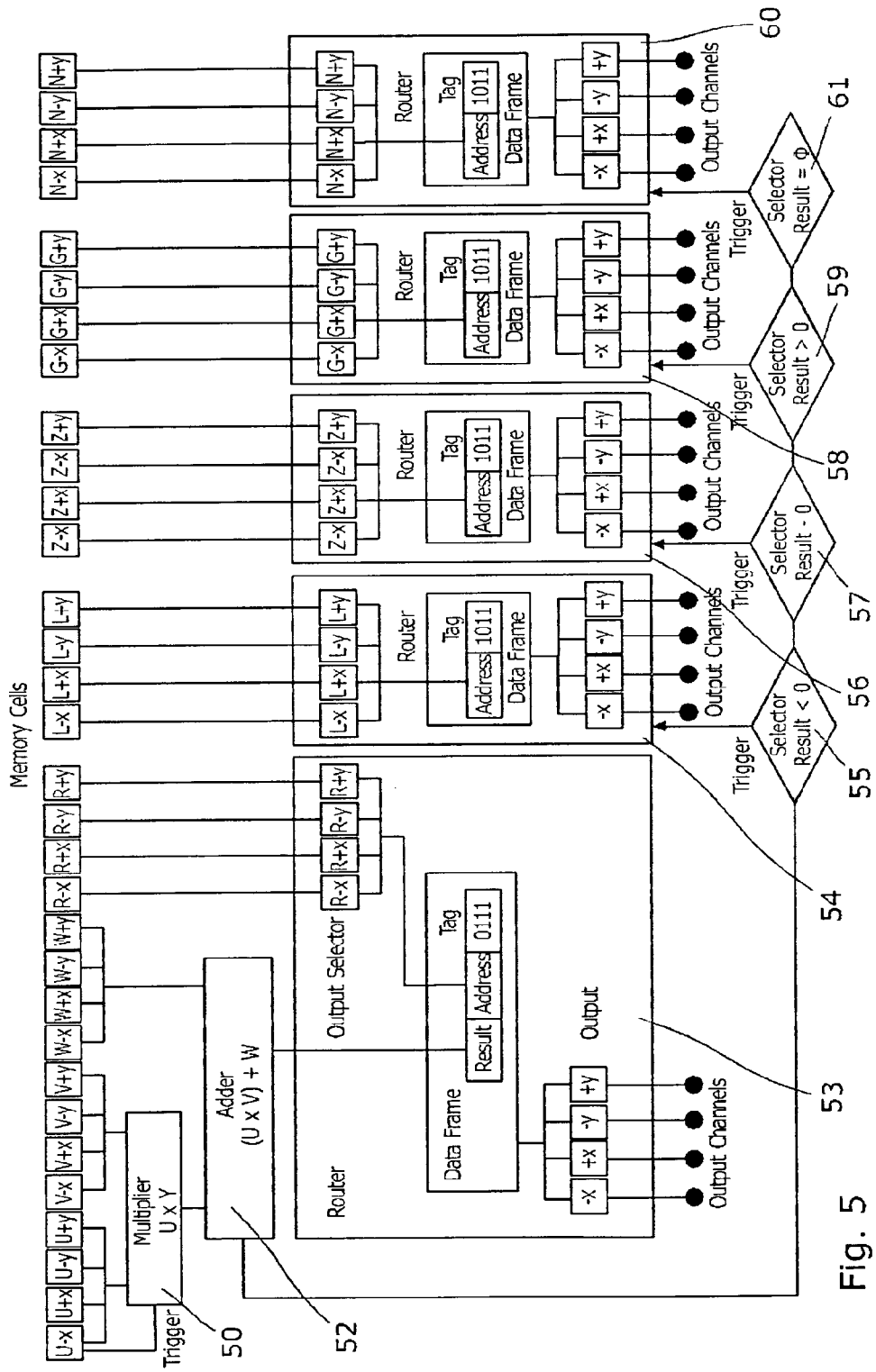
FIG. 5 is a diagram of one of the processors of the chip of FIG. 1.

While FIG. 5 shows three i bits and three f bits for simplicity, this embodiment uses 64-bit numbers with 32 bits in the integral part and 32 bits in the fractional part.

Addressing

The data field is interpreted as a number in its entirety. If the address field is one of the numbers $\pm\infty$ or $\Phi$ it is interpreted as the single, first, address i; otherwise it is interpreted as two addresses, the first address $a_1$ being defined by the i bits and the second address $a_2$ being defined by the f bits. The tag field represents four bits, each of which may be set or else clear. If the c tag is set then the data frame carries control, otherwise it does not carry control. A data frame that carries control is called a control token. If the d tag is set then the data frame carries data, otherwise it does not carry data. A data frame that carries data is called a data token. If the $a_1$ tag is set then the data frame is still to be delivered to the first address $a_1$ which is $\pm\infty$, or a general address i, otherwise it is no longer to be delivered to this address. If the $a_2$ tag is set then the data frame is still to be delivered to the second address, $a_2$, otherwise it is no longer to be delivered to this address. The data frame is not put on the bus if the address field is nullity, $\Phi$. The addresses $a_1$ and $a_2$ may target the same processor or different ones. Using two distinct addresses allows control to fan out from a single thread to two parallel threads. If the target processors are different then the data frame is to be delivered to the first address, $a_1$, before the second address, $a_2$. If both of the $a_1$ and $a_2$ tags are clear then the data frame is empty and may be written to by a processor.

Tuple Connection to the Bus

As described above, each tuple 12 is connected to four linear buses 20 in superposition: left, right, up, and down. FIG. 3 shows the connection of a tuple 12 to a general, up-address or down-address, linear bus. This embodiment of the chip has four separate buses connected to each tuple, but other embodiments may share buses between adjacent tuples if there is an appropriate space/time trade off in favour of sharing. All of the buses on the chip are referred to collectively as "the bus."

I/O Tuples

As described above, the tuples 12 are laid out in a nominally rectangular array of rows and columns. Each tuple is connected to four linear buses in superposition: left, right, up, and down. The first and last tuple in a linear bus are addressed by $\pm\infty$ and perform I/O, whereas the intermediate tuples are processors. The on-chip I/O device(s) transport tokens onto the relevant bus or transport tokens off the relevant bus at an I/O tuple. If an I/O tuple is the target of a token that is inbound from a peripheral device to the chip then the tuple writes the token to the output device on the opposite linear bus. This allows a ping test of the I/O tuple. If a token arrives at an I/O tuple on an outward bound bus then it is written to the output device. If the token did not target the I/O tuple then it arrived because it was not caught at an earlier target—a hardware or compiler error. Off-chip processors may test for this error.

The behaviour of the I/O tuples on catching a control token is architecture dependent and may be used to condition the processing of I/O. An I/O tuple may write a token to a location within the chip to report some condition, though in this embodiment of the chip no use is made of control tokens at I/O tuples.

Infinity is the most extreme number so it is not possible to address any memory cell beyond the zeroth, u, cell of an infinity processor. The infinity tuple always lies beyond the real numbered processors so the number of processors in a linear bus, and hence the shape of the chip, is of no consequence to chip I/O, though it may affect the propagation of tokens within the chip. This is useful if the chip has a non-rectangular shape due to a non-rectangular fabrication geometry or to fabrication errors within the chip.

Processors

Referring to FIG. 5 each processor 12 comprises an 8-tuple of eight physical memory cells u, v, w, r, l, z, g, n. The cells are numbered from zero to seven. Hence, u is known as the zeroth element of the tuple and n is known as the seventh element. Numbering from zero is useful when performing modulo arithmetic, as is done in hardware when masking addresses to detect the target of tokens. The physical 8-tuple holds data that are manipulated by a processor 12 which can be a manipulator or an I/O device 12. Either kind of device may write to any of the four linear buses adjacent to it. A physical tuple is conditioned to write to a labelled bus by receiving the write address on a virtual cell with the label −x, +x, −y, +y. Thus, there are four virtual memory cells corresponding to each physical cell of a tuple, giving a total of 32 virtual cells: $(u_{-x}, u_{+x}, u_{-y}, u_{+y}, v_{-x}, v_{+x}, v_{-y}, v_{+y}, w_{-x}, w_{+x}, w_{-y}, w_{+y}, r_{-x}, r_{+x}, r_{-y}, r_{+y}, l_{-x}, l_{+x}, l_{-y}, l_{+y}, z_{-x}, z_{+x}, z_{-y}, z_{+y}, g_{-x}, g_{+x}, g_{-y}, g_{+y}, n_{-x}, n_{+x}, n_{-y}, n_{+y})$ Again, the elements are numbered from zero so $u_{-x}$ is the zeroth element of the virtual 32-tuple and $n_{+y}$ is the thirty-first element. In this embodiment the address of these cells is represented by the least significant five bits of an address, with the address of the processor represented by the more significant bits. The Cell $u_{-x}$ is labelled zero (00000), and the remaining cells are labelled in increasing order from 1 to 31 (00001 to 11111). Therefore each of the virtual memory cells of each processor has its own address and can be targeted with data from another processor on the bus, or internally from within the same processor.

Each processor is arranged to perform the instruction:

u×v+w→r' write (r', r)

jump(r', l, z, g, n)

The first line of the instruction is a transreal multiplication and addition. The processor therefore includes a multiplier 50 arranged to perform a multiplication of the numbers in the u and v cells, and an adder 52 arranged to add the output of the multiplier, which is held as a temporary variable in the processor, to the number in the w cell. This line can compute any combination of addition, subtraction, and multiplication. Division can be implemented by using many instructions to construct the reciprocal and multiplying it out. Similarly, mathematical functions and general computations can be implemented in many instructions.

The second line of the instruction puts a data token on the correct linear bus so that it will write the result r' into one or two memory cells in one or two tuples. If the address r was written into the $r_{-x}$ virtual register then r' is written onto the −x bus, and, correspondingly, receipt of r at $r_{+x}, r_{-y}, r_{+y}$ causes r' to be written onto the +x, −y, +y buses. This is achieved by a router 53 which receives the output from the adder 52 and puts it into a data token. The router 53 also takes the address r from the $r_i$ virtual cells and puts it into the address field of the data token, and then puts the data token onto the appropriate bus. The physical l, z, g, n memory cells are treated similarly. However, the physical u, v, w cells are data for a calculation and do not vary their behaviour according to the virtual memory cell at which they arrive. However, they should be addressed as $u_{-x}, v_{-x}, w_{-x}$, keeping the other virtual addresses free for future use.

The jump instruction puts a control token on the bus. The result r' from the adder 52 is input to four selectors 55, 57, 59, 61 the first of which responds if r' is less than zero, the second if r' is zero, the third if r' is greater than zero and the fourth if r' is nullity. The triggered selector triggers operation of a respective router 54, 56, 58, 60 which takes the address from the $l_i, z_i, g_I$ or $n_i$ virtual cells, puts it as the address into a control token, and puts the token on the appropriate bus.

The write puts its token on the bus before the jump puts its token on the bus. Hence, when data and control are passed to the same tuple, the data token arrives before the control token. With this spacetime topology it is possible to use the instruction to implement memory-locking algorithms. No further timing control need be implemented in hardware—beyond that needed to link a tuple to the bus. The precise nature of this linkage is critical to the performance of the chip.

The jump instruction can halt, continue a serial thread, or branch into two parallel threads. A thread halts when it jumps to the Φ processor. It follows that the nullity processor can never execute. Furthermore, as the tuple architecture is fetch-less (has no read) it follows that a write to nullity is a no-op so the nullity processor needs no memory. As the nullity processor does no processing and has no memory it need not be implemented as a tuple. The nullity processor can still be addressed in a control jump or a write, but it is implemented as a no-op at the source of the jump or write.

A very useful side effect of excluding nullity processors is that it excludes the lines at nullity from the transreal plane. This simplifies the topology to be exactly a real plane extended with an oriented line at infinity. The line at infinity is used for I/O, leaving all processors in the real plane.

The jumps are performed as follows:

Jump to (1) if r'<0

Jump to (z) if r'=0

Jump to (g) if r'>0

Jump to (n) if r'=Φ

The processor implements the jump by putting a control token on the correct linear bus so that it will be carried to the $a_1$ and $a_2$ address in l, z, g, n=±($a_1.a_2$).

Processors have a buffer that accepts tokens from the bus. When the processor computes it copies the buffer into internal registers and operates on the internal registers.

Handling of Tokens on the Bus

As described above, each processor has an address P with five address bits reserved to indicate 32 addresses internal to the processor. A data frame is examined when it arrives at a processor. Firstly, if P matches i and $a_1$ is set and d is set then the data field is written from the bus into the processor and $a_1$ is cleared, indicating that delivery is no longer required to this address. Then, secondly, if P matches f and $a_1$ is clear and $a_2$ is set and d is set then the data field is written from the bus into the processor and $a_2$ is cleared and d is cleared, indicating that delivery is no longer required anywhere. Thirdly, if P matches i and $a_1$ is set and c is set then a single cycle of processor execution is initiated and $a_1$ is cleared, indicating that delivery is no longer required to this address. Then, fourthly, if P matches f and $a_1$ is clear and $a_2$ is set and c is set then a single cycle of processor execution is initiated and $a_2$ is cleared and c is cleared, indicating that delivery is no longer required anywhere. Note that only one cycle of processor execution is initiated even when both i and f initiate execution at the same processor. Fifthly, if P matches f and $a_1$ is set then delivery to the first address failed. This is an error condition. No data is written into the processor and execution is not initiated. It follows that the data frame will be passed along the bus to its terminus without delivering data anywhere.

Once all of the processors on a bus have had an opportunity to write into their respective data frame on the bus, the data frames are moved one position along the bus. In the preferred implementation this is achieved by copying the data frame into a temporary data frame, and then copying it into its neighbour.

Operation of I/O Devices

If the data frame at the terminus of a bus has either of the c or d bits set then it is written off chip by an I/O device. If the single address is ∞ on an up-address bus, or −∞ on a down address bus, then the bus frame correctly targeted the I/O device and is to be treated, by off-chip devices, as a valid data frame. Any other address indicates a delivery error and is to be given appropriate error handling by the offchip device.

Operation of Processor Connection to the Bus

A tuple accepts tokens from and writes tokens to the bus frame at its position. It accepts a token from a bus frame before writing to that bus frame so that it can reuse the bus frame. This makes efficient use of bus bandwidth and means that if communication within an isolated neighbourhood of the chip is restricted to hops between adjacent tuples then the bus is always ready to transport tokens. This readiness of the bus can be made global by reserving, say, the right and down linear buses for short writes to adjacent tuples and by performing long writes and jumps to non-adjacent tuples only in regions of the left and up buses. The long jumps must be kept at a density that does not over fill the bus. It is possible to switch between short/long arrangements in regions of the chip so as to allow rapid communication anywhere on chip.

Each processor tuple can write and jump to itself internally, without using the bus. In this case the writing and/or jumping time is incorporated in the standard instruction time so that a processor cannot write tokens faster than it can read them.

Tokens may be pushed from the buses into a tuple's buffer in arbitrary order. This allows arbitrary multiplexing of processor/bus communications. However, if the processor is busy so that it cannot accept a token then the token continues on the bus until it is written off chip by an I/O tuple. In this way, bus contention errors are self-reporting. Note that bus contention implies a compiler or hardware error and should not happen. Similarly, if a token arrives at $a_2$, but has not been delivered to $a_1$, then the token is passed along the bus to autoreport its error. This ensures that the token is not delivered to $a_2$ before it is delivered to $a_1$ and means that data and control at $a_2$ can be used to check delivery to $a_1$. It is the compiler's responsibility to exploit the timing rules to obtain correct execution. It may do so at compile time by determining the timing in a local region of the bus and/or at run time by implementing memory-locking algorithms.

Bus Power Management

If the control, c, and data, d, tags are clear then a bus frame is not copied. If the control tag is set but the data tag is clear then the whole tag and the control number are copied. If the data tag is set then the whole bus frame is copied. Thus, substantial power is used to move only valid data.

Handling of Data by Processors

If a data frame that targets any of the $u_i$ memory cells of a processor has its d tag set then the frame's data field is written into the u memory cell of the multiplier. Similarly, a data field targeting any of the $v_i$ memory cells is written into the v memory cell of the multiplier and a data field targeting any of the $w_i$ memory cells is written into the w field of the adder. Similarly, a data field targeting any of the $r_i$ memory cells is written into the address field of the data frame in the router, and the router takes an additional action. If the data field targeted $r_i$ then the −X bus is selected for output. Similarly, if the data field targeted $r_{-x}, r_{-y}, r_{+y}$, then the corresponding +X, −Y, +Y bus is selected for output.

All of the $l_i$ memory cells feed into a router 54, the $z_i$, $g_i$ and $n_i$ memory cells feed into respective routers 56, 58, 60. All of the routers operate in the same way. For example, if a data frame that targets any of the $l_i$ memory cells of a processor has its d tag set then the frame's data field is written into the address field of the router. If the data field targeted then the −X bus is selected for output. Similarly, if the data field targeted $l_{+x}, l_{-y}, l_{+y}$, then the corresponding +X, −Y, +Y bus is selected for output. The data frame's tag field is set to indicate delivery of control to the first and second addresses.

Execution at a processor is initiated by a data frame, with the c tag set, that is, a control token, targeting any virtual memory cell in the processor. Discarding the address bits associated with the virtual memory cells means that just the processors address, P, is used, but this is equal to the $u_{-x}$ address of the memory cell of a processor. FIG. 5 shows execution being triggered by the arrival of a control token at the $u_{-x}$ memory cell. The arrival of this control token causes the multiplier to multiply its u and v memory cells together and to write the product into the adder where the product is added to the contents of the w cell. The resultant sum is then written into the data field of the data frame. The data frame's tag field is set to indicate delivery of data to the first and second addresses. The data frame is then written onto the selected output bus, unless the address is nullity, in which case it is not put on the bus. The resultant sum from the adder is also written to each of four selectors causing exactly one of the routers to be triggered depending on whether the result is less than zero, equal to zero, greater than zero, or equal to nullity. The triggered router then writes its data frame onto the selected output bus, unless the address is nullity, in which case it is not put on the bus. This write is timed so that it occurs after the write of data from the router targeting the memory cells.

The timing of all the processors is controlled by a common clock signal, which may be the same as that used to control the bus. The processors are arranged to respond to the clock signal to perform the instruction once per cycle, and all the processors operate with the same timing, so that each of them puts data onto the bus at the same time. Within each cycle, the timing at which the data is written from the bus into a processor will depend on the time at which data addressed to the processor is on the bus adjacent to the processor. As data may move along the bus with a frequency higher than the instruction execution frequency, the time of writing data into a processor can vary from one processor to the next.

Notation

A summary of the notation used in the description of the preferred embodiment is as follows:

−x: a subscript denoting the negative x-axis from the origin of a Cartesian co-ordinate frame.

+x: a subscript denoting the positive x-axis from the origin of a Cartesian co-ordinate frame.

−y: a subscript denoting the negative y-axis from the origin of a Cartesian co-ordinate frame.

+y: a subscript denoting the positive y-axis from the origin of a Cartesian co-ordinate frame.

$a_1$ the address appearing first in the form $\pm(a_1.a_2)$.

$a_1$ a tag bit in the bus frame denoting whether the token has still to be delivered to the address $a_1$ or has been delivered.

$a_2$ the address appearing second in the form $\pm(a_1.a_2)$.

$a_2$ a tag bit in the bus frame denoting whether the token has still to be delivered to the address $a_2$ or has been delivered.

c: a tag bit in the bus frame denoting whether the frame contains control.

d: a tag bit in the bus frame denoting whether the frame contains data.

f: the fractional bits in a fixed-point number.

g: the sixth cell of a physical 8-tuple, being the address to jump to on a result that is greater than zero.

i: the integral bits in a fixed-point number, including the bit patterns for sign, infinity, and nullity.

l: the fourth cell of a physical 8-tuple, being the address to jump to on a result that is less than zero.

n: the seventh cell of a physical 8-tuple, being the address to jump to on a nullity result.

P: the address of a processor. This is the address of the zeroth, u, cell of a physical 8-tuple.

r, r': here, r is the third cell of a physical 8-tuple, being the address of the result of the instruction fragment $u \times v + w \rightarrow r'$ with the result held in the temporary variable r'.

u: the zeroth cell of a physical 8-tuple, being the first argument of the instruction fragment $u \times v + w \rightarrow r'$.

v: the first cell of a physical 8-tuple, being the second argument of the instruction fragment $u \times v + w \rightarrow r'$.

w: the second cell of a physical 8-tuple, being the third argument of the instruction fragment $u \times v + w \rightarrow r'$.

z: the fifth cell of a physical 8-tuple, being the address to jump to on a zero result.

Advantages

The embodiment described above has a number of advantages:

- It has I/O and power supply everywhere on the periphery of the chip so there is massive I/O bandwidth and redundancy in both I/O and power supply. However, redundant power supply requires careful handling to avoid unwanted charge flows and electrical noise. Nonetheless, this bandwidth and redundancy provide a degree of future proofing.
- The strategy of handling I/O everywhere in the periphery means that if a token is not caught then this error automatically reports itself by the token being written to the output device which may be programmed to test for uncaught tokens.
- The processor instruction can be extended to a tuple of any power-of-two length, thereby allowing arbitrarily complex instruction sets to be implemented. This provides a degree of future proofing.
- There are six bits of redundancy (associated with the virtual versions of the physical u, v, w addresses) that might be used to condition the processor to perform in different ways. Again, this provides some future proofing by allowing some flexibility with only a modular change to the processor architecture and compiler.

In the embodiment described above, a transnumber is represented by a bit string. The strictly transreal numbers, i.e. $\pm\infty$ or $\Phi$, use the whole of the bit string, but real numbers are represented in two parts, as i.f, where i is the integer part of the number and f is the fractional part. The addressing scheme allows zero, one or two targets to be addressed. If the address is nullity, $\Phi$, then a data frame is not put on the bus so no target is addressed. If the address is one of the signed infinities, $\pm\infty$, then one I/O device is addressed. If the address is a real number then i is interpreted as the first address and f is interpreted as the second address. In general i and f target memory cells in different processors so that two targets are addressed, but they may address the same or different memory cells within a single processor so that one processor or one memory cell is addressed. Thus, it is possible to address no targets, one I/O device, one or two memory cells within one processor, or two memory cells in two different processors. This is entirely satisfactory, but a difficulty is that i carries the sign bit and f has no sign bit. Hence, there is a natural representation for all positive addresses and for a negative first address, but there is no natural representation for a negative second address.

The problem of not having a natural representation for a negative address is solved in any scheme that uses only positive addresses. The simplest such scheme is just to use a line or lattice laid out in the first quadrant of a 2D Cartesian co-ordinate frame, i.e. the part of the coordinate system shown in FIG. 1, but this limits how chips may be joined to each other. In this case, chips can only be added along the positive axes, not along the negative axes. This limits the tilings of space that a machine might exploit.

Figure 6:
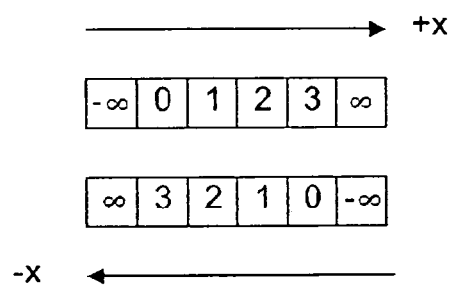
FIG. 6 is a diagram showing addressing on a bus forming part of a second embodiment of the invention.

Therefore, Referring to FIG. 6, in a second embodiment of the invention another solution is used. The solution proposed here is to number each bus with consecutive natural numbers from zero, at the $u_{-x}$ memory cell of the processor adjacent to the input device, which is numbered $-\infty$, at the edge of the chip, to some positive number, n, at the $n_{+y}$ memory cell adjacent to the output processor, which is numbered $+\infty$, at the edge of the chip. In this way each memory cell has a, generally, different address on each bus, but the addresses are related to each other in a simple way. Moreover, the addresses can target a memory cell in a processor that lies arbitrarily many chips away and, most importantly, all address calculations are carried out in a natural way in transarithmetic.

Each bus has an entry point at an input device numbered $-\infty$ and an exit point at an output device numbered $+\infty$. The intervening memory cells within processors are numbered in sequence from zero to some positive number n, as shown in FIG. 6. In this way, a single memory cell has, in general, a different address on each bus.

To convert a real address, c, of a memory cell on a bus to its address, c', on the opposite bus, the simple algorithm $$n-c \rightarrow c'$$

is performed. This operation is idempotent so $$n-c' \rightarrow c$$

The strictly transreal addresses are correct as is. They do not need to be converted by any other means to map to an address on the opposite bus. If a real address c>n then the targeted memory cell is on a different chip. Tokens addressed to it will be passed along the bus on the current chip to the output device, numbered $+\infty$. The output device is then arranged to decrement the address by the width of the current chip, n+1, and to output the token so that it can be placed on the next chip. On the next chip, the address will now either be of a low enough number to correspond to an address on that chip, in which case it will be delivered there, or it will still be too large for that, in which case it will be transmitted across that next chip to the output device of that next chip where the address will again be decremented, and the token placed on a still further adjacent chip. This process can be repeated any number of times until the token is delivered to a processor on the appropriate chip. It will be appreciated that, in this arrangement, each chip has addresses for all of its processors, and, for identical chips, the addresses for the corresponding processors can be the same. However the target address as carried by the token can be larger, and is in effect a 'relative' address, identifying the target processor by its position relative to the current position of the token.

In this system, each chip has its own I/O devices numbered ±∞. This implies that there are many routes to ±∞. No real numbered, negative address is used. Such addresses are, therefore, available to encode something else which may depend on the specific design of a particular system. Such addresses will be the twos complement of their corresponding positive address.

If chips have faults, or a non-square geometry, then there may be different numbers of live processors on busses of different chips, so each chip is responsible for performing its own decrement. This decrement may be delegated to an off-chip device. If the chips are stacked vertically then an off-chip device may route a signal very quickly to its target chip. Such short cuts would affect the timing rules that the compiler might exploit.

The invention claimed is:

1. A processing apparatus comprising a plurality of processors, each arranged to perform an instruction and to output data and control tokens, and a bus arranged to carry the data and the control tokens between the processors, wherein each processor is arranged, if it receives a one of the control tokens via the bus, to carry out the instruction, and on carrying out the instruction, to perform an operation on the data to produce a result, to identify any of the processors which are to be data target processors, and to transmit output data to any identified data target processors, to identify any of the processors which are to be control target processors, and to transmit a control token to any identified control target processors, wherein each processor is arranged to select at least one of the target processors on the basis of the result.

2. A processing apparatus according to claim 1 wherein each processor has an address and is arranged to write the output data to the bus, together with the address of any data target processor.

3. A processing apparatus according to claim 1 wherein each of the processors can identify a plurality of data target processors to which the output data can be sent in parallel.

4. A processing apparatus according to claim 1 wherein the bus is arranged to transmit the output data to the identified data target processor so that it can be written into the data target processor.

5. A processing apparatus according to claim 1 wherein each processor is arranged to transmit a control token by writing it to the bus together with the address of the control target processor to which it is to be transmitted.

6. A processing apparatus according to claim 1 wherein each processor can, on performing the instruction, identify a plurality of control target processors to which it can transmit control tokens in parallel.

7. A processing apparatus according to claim 1 wherein each processor is arranged, when it has transmitted the output data and a control token to any identified target processors, to give up possession of its control token so that it will not perform the instruction again until it receives another control token.

8. A processing apparatus according to claim 1 wherein each processor is arranged to perform the same instruction.

9. A processing apparatus according to claim 1 wherein each processor is arranged to perform only one instruction.

10. A processing apparatus according to claim 1 wherein the instruction is a multiply-add of the form $a \times b + c \rightarrow r'$.

11. A processing apparatus according to claim 1 wherein each processor is arranged to determine whether the result is less than zero, zero, greater than zero, or nullity, and select a target processor accordingly.

12. A processing apparatus according to claim 1 wherein the instruction has a plurality of inputs and each processor comprises a plurality of memory cells in which the inputs to the instruction can be stored.

13. A processing apparatus according to claim 1 wherein each processor has an address and comprises a plurality of memory cells in which addresses of the target processors can be stored.

14. A processing apparatus according to claim 1 wherein each processor comprises a plurality of memory cells in which the result of the operation can be stored.

15. A processing apparatus according to claim 1 wherein all memory in every processor is set to a fixed value on power up.

16. A processing apparatus according to claim 1 comprising a plurality of chips each comprising a plurality of the processors, each chip having a plurality of output devices from which tokens can be transferred to another of the chips, wherein each processor on each chip has an address associated with it, the addresses being within a range, the apparatus being arranged, on receipt by the output device of a token having a target address which is outside the range, to perform a modification of the target address by an amount corresponding to the width of the chip, and to transfer the token to said other of the chips.

17. A processing apparatus according to claim 16 wherein the output devices are arranged to perform said modification.

18. A processing apparatus according to claim 16 comprising a further off-chip device is arranged to perform said modification.

* * * * *